July 12, 1960 H. L. MORRILL, JR 2,944,591
SWIVEL SEAT ATTACHMENT

Filed April 15, 1959 5 Sheets-Sheet 1

Inventor
HARRY L. MORRILL, JR.

By
Kimmel & Crowell
ATTORNEYS

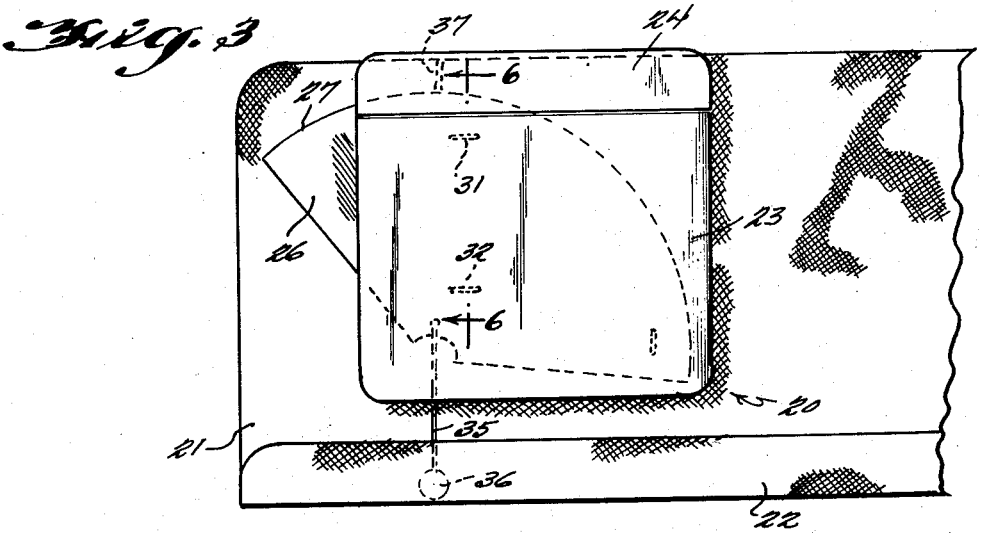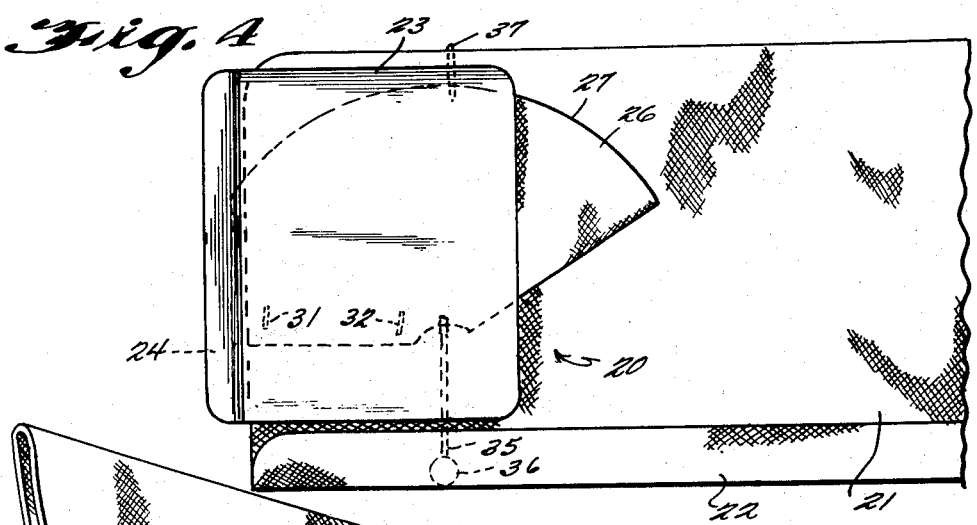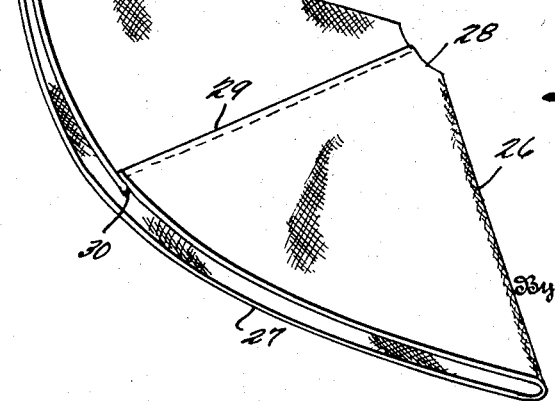

July 12, 1960 H. L. MORRILL, JR 2,944,591
SWIVEL SEAT ATTACHMENT
Filed April 15, 1959 5 Sheets-Sheet 3
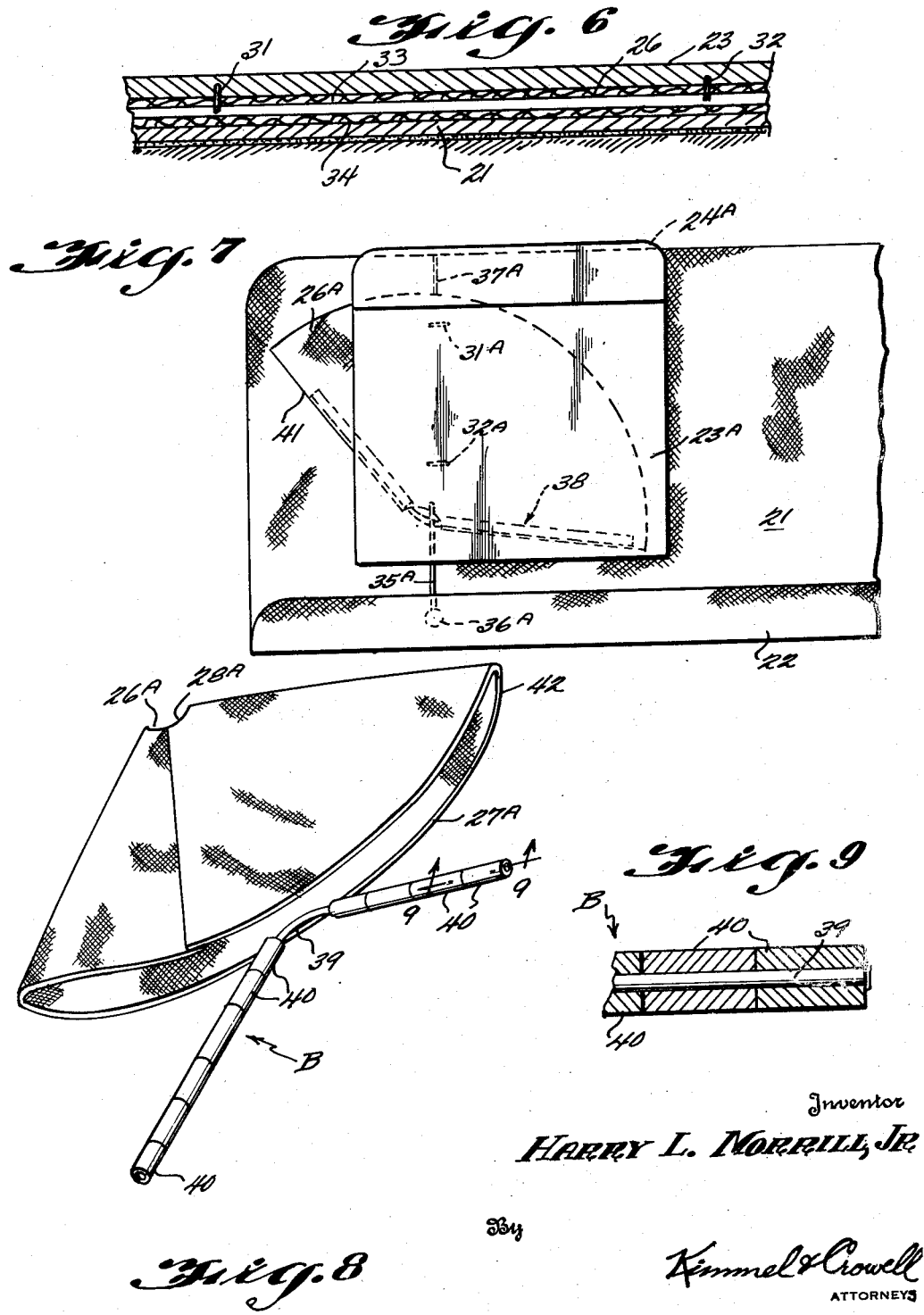
Inventor
HARRY L. MORRILL, JR.
By
Kimmel & Crowell
ATTORNEYS July 12, 1960   H. L. MORRILL, JR   2,944,591
SWIVEL SEAT ATTACHMENT
Filed April 15, 1959   5 Sheets-Sheet 4
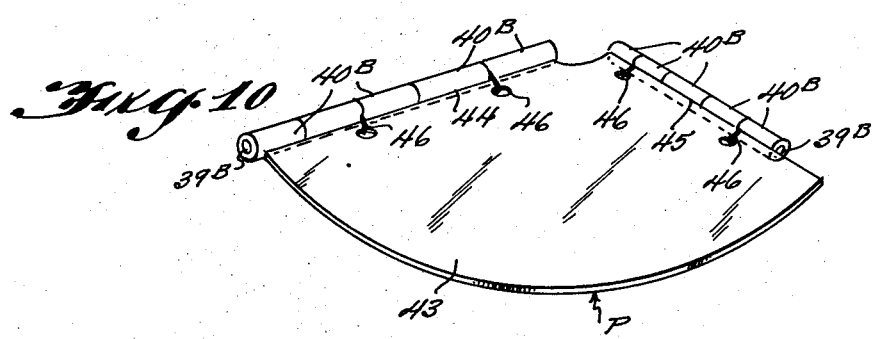
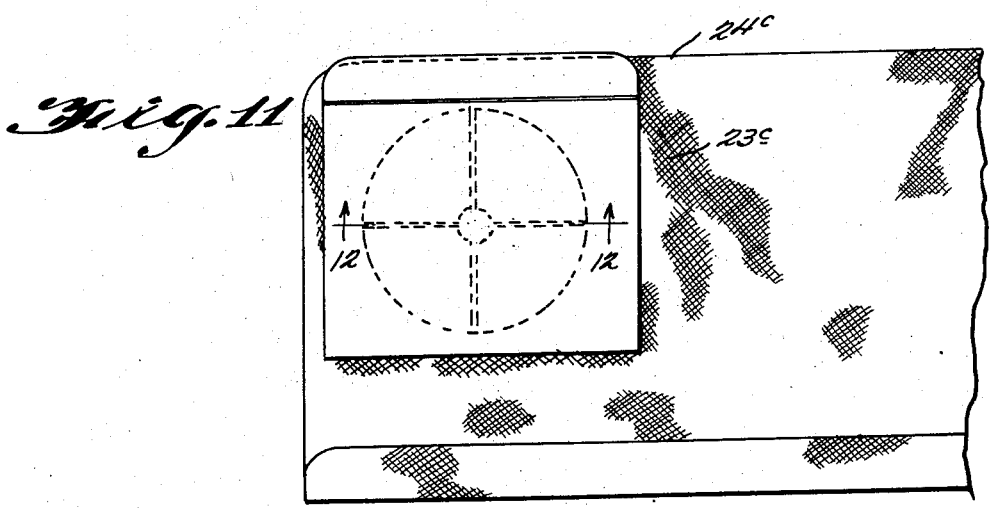
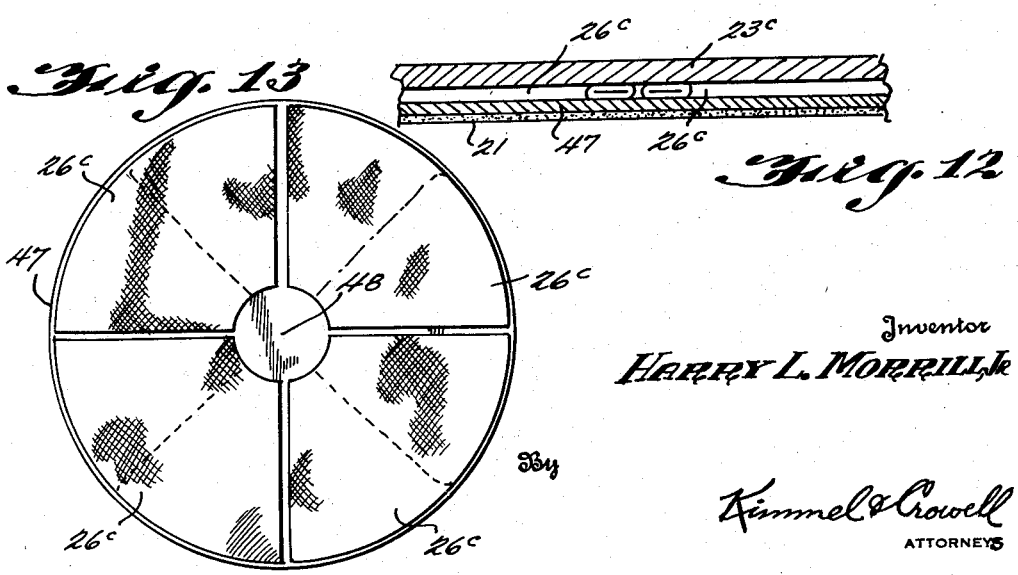
Inventor
HARRY L. MORRILL, Jr
By
Kimmel & Crowell
ATTORNEYS July 12, 1960 H. L. MORRILL, JR 2,944,591
SWIVEL SEAT ATTACHMENT
Filed April 15, 1959 5 Sheets-Sheet 5

Inventor
HARRY L. MORRILL, JR.

Kimmel & Crowell
ATTORNEYS

United States Patent Office 2,944,591
Patented July 12, 1960

2,944,591

SWIVEL SEAT ATTACHMENT

Harry L. Morrill, Jr., 258 Hurt Bldg., Atlanta, Ga.

Filed Apr. 15, 1959, Ser. No. 806,527

8 Claims. (Cl. 155—10)

The present invention relates to a swivel seat attachment and particularly to a swivel seat attachment for conventional automobile seats.

The primary object of the invention is to provide a swivel seat attachment for the top of automobile seats by means of which the user can move from a normal forward facing position to a side facing position with a friction free, sliding swivel action.

Another object of the invention is to provide a swivel seat attachment for automobile seats in which means are provided for preventing sliding movement of the occupant on curves, due to centrifugal forces.

A further object of the invention is to provide a swivel seat attachment for vehicle seats which can be secured thereto without requiring structural changes in the vehicle seat.

A still further object of the invention is to provide a device of the class described above which is inexpensive to manufacture, simple to attach and which is completely effective in providing the required circle action.

Other objects and advantages will become apparent in the following specification when considered in light of the attached drawings, in which:

Figure 3 is a top plan view of the invention with the device in forward facing position;

Figure 4 is a top plan view of the invention with the device in side facing position;

Figure 5 is a perspective view of the cloth sleeve removed from the seat;

Figure 6 is an enlarged fragmentary vertical sectional view taken along the line 6—6 of Figure 3, looking in the direction of the arrows;

Figure 7 is a top plan view of a modified form of the invention;

Figure 8 is an exploded perspective view of the working parts of the device illustrated in Figure 7;

Figure 9 is an enlarged fragmentary vertical sectional view taken along the line 9—9 of Figure 8, looking in the direction of the arrows;

Figure 10 is a perspective view of a modified bearing structure;

Figure 11 is a top plan view of still another modified form of the invention;

Figure 12 is an enlarged fragmentary vertical sectional view taken along the line 12—12 of Figure 11, looking in the direction of the arrows;

Figure 13 is a top plan view of the structure illustrated in Figure 11 with the seat removed;

Figure 1:
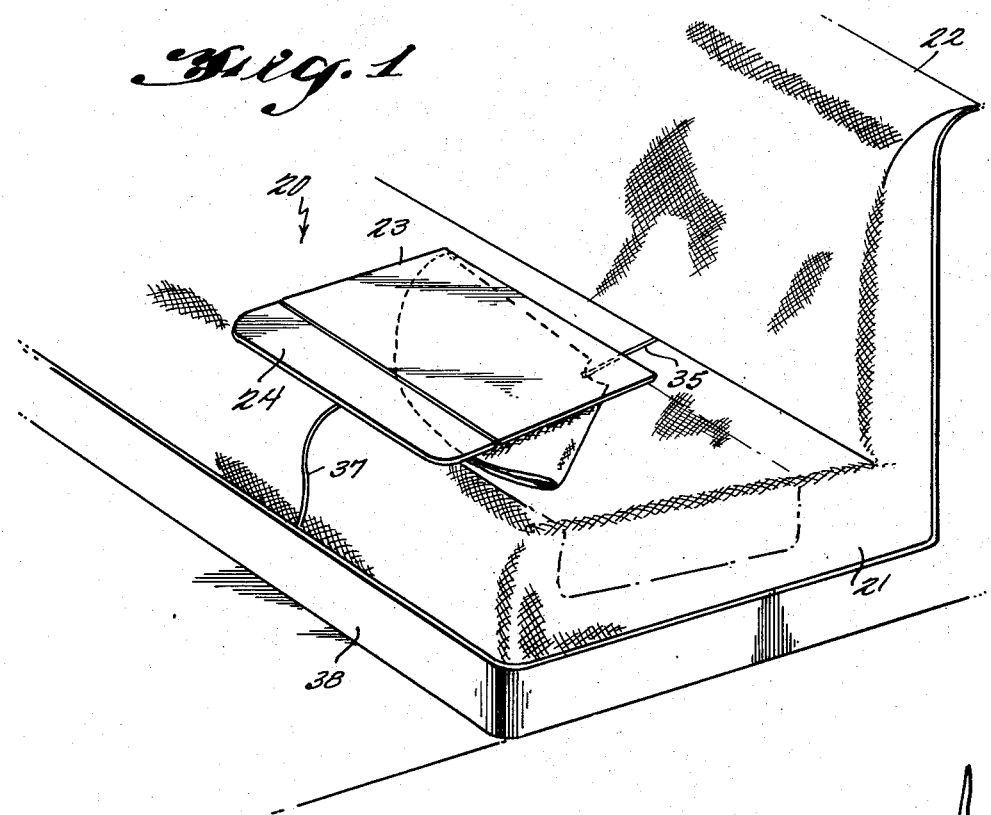
Figure 1 is a perspective view of the invention.

Referring now to the drawings in detail wherein like reference characters indicate like parts throughout the several figures, the reference numeral 20 indicates generally a swivel seat structure constructed in accordance with the invention.

The swivel seat attachment 20 is used in conjunction with motor vehicles and is supported on an upholstered seat unit 21. An upholstered back 22 extends upwardly from the upholstered seat 21 in the normal manner. The attachment 20 includes a panel 23 having a second relatively narrow panel 24 secured to the front edge thereof by means of a flexible hinge 25. In the position of the seat illustrated in Figures 1 through 3, the panel 24 is substantially aligned with the panel 23 and when the panel 23 is turned to the side in the position illustrated in Figure 4, the panel 24 folds downwardly over the edge of the seat 21 so as not to obstruct the closing of the door of the vehicle after the operator has left the vehicle.

A cloth sleeve 26 has a semi-circular outer edge 27 and a semi-circular inner edge 28. The sleeve 26 has a pair of relatively straight side edges 29, 30 which are overlapped and secured together by stitching, or the like. The sleeve 26 has a relatively slick inner surface so that one face of the inner surface will move readily with respect to another face of the inner surface in contact therewith. The over-all sleeve 26 is segmental in shape and covers approximately 135 degrees of the circle.

Figure 2:
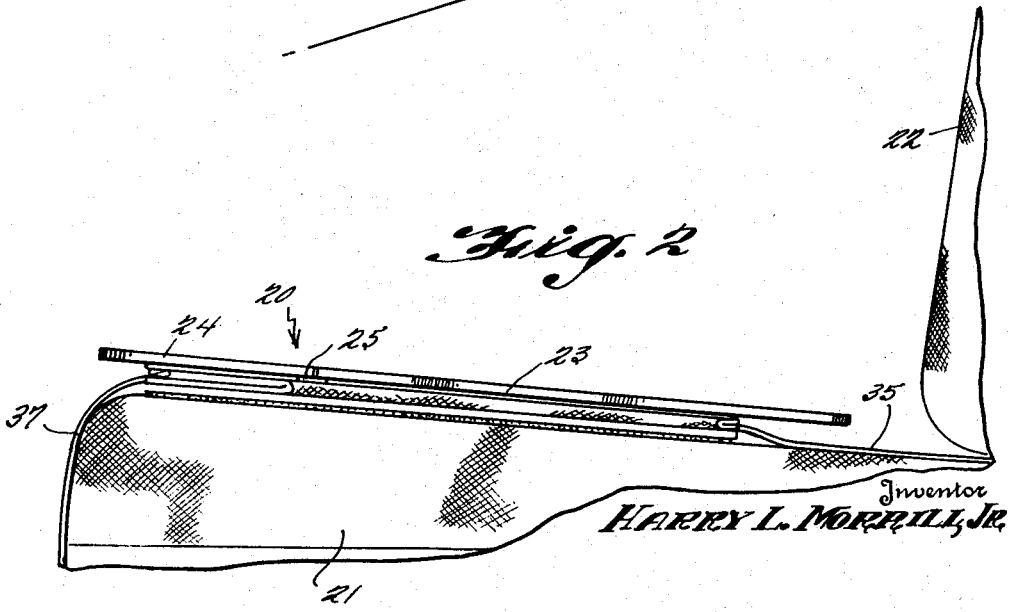
Figure 2 is a side elevation of the invention.

With the panel 23 in the position illustrated in Figures 1 and 3, a central upper portion of the sleeve 26 is secured to the panel 23 at 31, 32. The sleeve 26, as illustrated in Figure 6, has an upper portion 33 and a lower portion 34 which are illustrated as being spaced apart for the sake of clarity. However, it should be understood that the portion 33 is in direct contact with the portion 34 and is adapted for sliding movement thereon.

A tether 35 is secured to the sleeve 26 adjacent the semi-circular edge 28 and extends rearwardly between the seat 21 and the back 22. The tether 35 has a retainer ball 36 on the rear end thereof which remains wedged between the seat 21 and the back 22, restraining the sleeve 26 against forward movement with respect to the seat 21. A second tether 37 extends forwardly from the sleeve 26 from a point adjacent the outer semi-circular edge 27 thereof and directly forwardly of the teth 35. The tether 37 extends downwardly to and is connected to the frame 38 of the seat 21 to restrain the sleeve 26 against movement rearwardly with respect to the seat 21.

In the preferred form of the invention illustrated in Figures 1 through 6, the occupant of the seat sits on the panel 23 which may be upholstered if desired, and when entering or leaving the vehicle merely turns his body to face in the desired direction with the panel 23 sliding and swinging on the sleeve 26 to move from a forwardly facing direction to a side facing direction and return, as desired by the operator.

In Figures 7 through 9 a modified form of the invention is illustrated wherein a panel 23A identical to the panel 23 has a relatively narrow panel 24A hingedly secured thereto in the same manner as the panel 24 is secured to the panel 23. The panel 23A has a cloth sleeve 26A secured thereto by securing elements 31A, 32A in the same manner as the sleeve 26 is secured to the panel 23. The sleeve 26A has a tether 35A secured thereto adjacent the semi-circular inner edge 28A. The tether 35A has a ball 36A on the rear end thereof positioned between the seat 21 and the back 22 to prevent the sleeve 26A from moving forwardly with respect to the seat 21. A second tether 37A extends forwardly from the sleeve 26A secured thereto at a point adjacent the semi-circular outer edge 27A. The tether 37A is secured to the frame of the seat 21 in the same manner as the tether 37.

In the form of the invention illustrated in Figures 7 through 9, a bearing, generally indicated at 8, includes an elongated shaft 39 having 135 degrees angularly offset sections. A plurality of bearing rollers 40 are journalled on the shaft 39 and arranged to engage in the folds 41, 42 of the sleeve 26A so as to reduce the friction of the sleeve 26A when turning to permit the panel 23A to swivel toward the side.

The tether 35A secures the shaft 39 in its position within the sleeve 26A to prevent it from becoming dislodged therefrom.

The modification illustrated in Figures 7 through 9 operates in the same manner as the preferred form of the invention illustrated in Figures 1 through 6, with the inner surfaces of the sleeve 26A being slick enough to prevent undue friction during the swiveling movement.

In Figure 10, another modified form of the invention is illustrated wherein a bearing, generally indicated at P, is provided as an alternate construction of the bearing B illustrated in Figures 7 through 9. The bearing P includes a segmental shaped plate 43 having angularly related side edges 44, 45. A pair of shafts 39B are secured in parallel relation to the side edges 44, 45 of the plate 43 by securing elements 46. A plurality of bearing rollers 40B are journalled on the shafts 39B to engage in the folds 41, 42 of the sleeve 26A in the same manner as the bearing rollers 40, as described above.

Another modified form of the invention is illustrated in Figures 11 through 13 wherein a panel 23C has a relatively narrow panel 24C hingedly secured to its forward edge in the same manner as the panel 24 is secured to the panel 23 in the preferred form of the invention. A circular plate 47 is arranged in centrally positioned spaced relation underlying the panel 23C and substantially parallel thereto. The plate 47 is arranged in engagement with the seat 21 and is secured thereto by any suitable means.

Four sleeves 26C identical in form to the sleeves 26 but of somewhat smaller over-all dimension are secured to the circular plate 47 in circularly spaced form, as can be seen in Figure 13. In this form of the invention, the panel 23C rotates about the center 48 of the circular plate 47 with the slick anti-friction inner surfaces of the sleeve 26C providing bearing surfaces to permit the panel 23C to be turned readily thereon.

Figure 14:
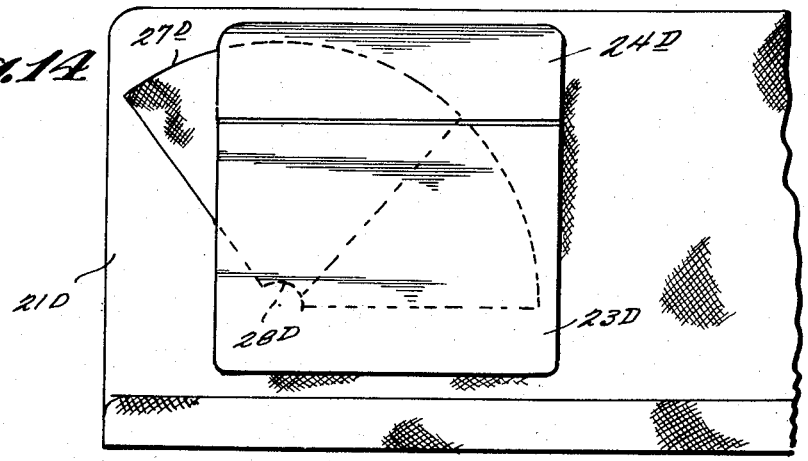
Figure 14 is a top plan view of a further modified form of the invention.
Figure 15:
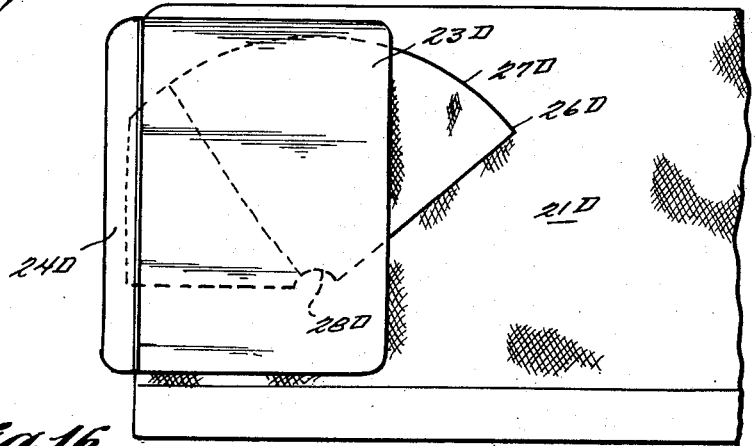
Figure 15 is a view similar to Figure 14 with the device rotated 90 degrees.
Figure 16:
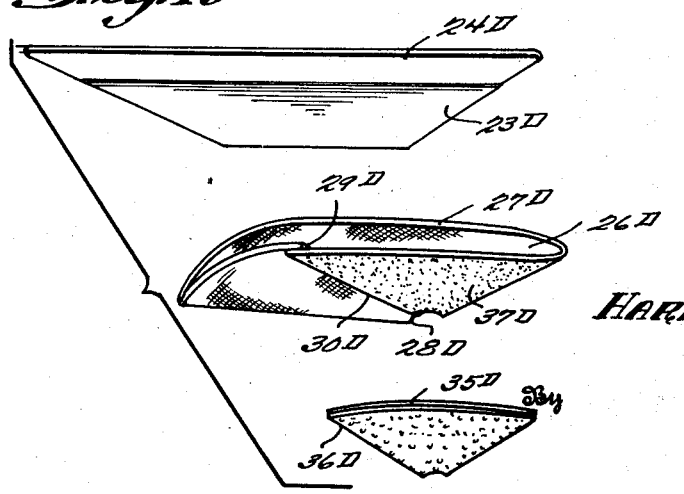
Figure 16 is an exploded perspective view of the structure shown in Figures 14, 15 removed from the vehicle seat.

A further modified form of the invention is illustrated in Figures 14 through 16 wherein a panel 23D has a relatively narrow panel 24D hingedly secured to its forward edge in the same manner as the panel 24 is secured to the panel 23 in the preferred form of the invention. A cloth sleeve 26D has a semi-circular outer edge 27D and a semi-circular inner edge 28D. The sleeve 26D has a pair of relatively straight side edges 29D, 30D which are overlapped and secured together by stitching, or the like. The sleeve 26D has a relatively slick inner surface so that one face of the inner surface will move readily with respect to another face of the inner surface in contact therewith. The overall sleeve 26D is segmental in shape and covers approximately 135 degrees of a circle.

With the panel 23D in the position illustrated in Figures 14, 15, a central upper portion of the sleeve 26D is secured to the panel 23D by adhesive or the like.

A segmental panel 35D has an abrasive coating 36D on its lower surface and the panel 35D is adhesively secured to a portion 37D of the sleeve 26D. The abrasive coating 36D engages the seat 21D to prevent the panel 23D from moving out of its normal position thereon. The adhesive coating 36D provides a sufficient grip for the sleeve 26D to eliminate the necessity of tethers as described for the other forms of the invention.

The device as illustrated in Figures 14 through 16 is used in the same manner as the preferred form of the invention illustrated in Figures 1 through 6.

While the particular material from which the sleeves 26, 26A, 26B, 26C and 26D are formed has not been above disclosed, it should be understood that any of the highly slick surfaced materials, such as silk, satin, nylons and other fabrics formed of artificial filaments, may be used as required.

Having thus described the preferred embodiments of the invention, it should be understood that numerous structural modifications and adaptations may be resorted to without departing from the scope of the appended claims.

What is claimed:

1. A swivel seat attachment for motor vehicle seats comprising a panel, a semi-circular segmental shaped flexible sleeve secured centrally to said panel in supporting relation thereto, said flexible sleeve having relatively slick contacting inner surfaces, and means securing said sleeve to an automobile seat whereby said panel may be pivoted on said seat with said contacting inner surfaces sliding against each other to pivot said panel.

2. A device as claimed in claim 1 wherein the means securing said sleeve to said seat comprises a pair of tethers secured to said sleeve in spaced relation, said tethers being adapted to be detachably secured to a motor vehicle seat.

3. The device of claim 2 wherein one of said tethers is provided with an enlarged end portion adapted to engage between the vehicle seat and its back.

4. A device as claimed in claim 1 wherein said sleeve has a pair of angularly related spaced folds connecting upper and lower portions thereof and anti-friction means is positioned between the upper and lower portions of said sleeve engaging in said folds.

5. A device as claimed in claim 4 wherein said anti-friction means includes a shaft having angularly related end portions and a plurality of rollers journalled on said shaft for engagement in said folds.

6. A device as claimed in claim 4 wherein said anti-friction means includes a segmental plate engaged between the upper and lower portions of said sleeve and a plurality of anti-friction rollers journalled to opposite side edges of said plate engaging in the folds of said sleeve.

7. A device as claimed in claim 1 wherein the means securing said sleeve to said seat comprises an abrasive panel mounted on said sleeve with the abrasive surface thereof in contact with said seat.

8. The structure of claim 1 wherein said sleeve is secured to said panel at more than one point whereby the pivotal movement is effected wholly by the sliding of said contacting surfaces of said sleeve.

References Cited in the file of this patent

UNITED STATES PATENTS

| | | |
|---|---|---|
| 2,744,565 | Zwick | May 8, 1956 |
| 2,811,199 | Morrill | Oct. 29, 1957 |
| 2,821,240 | Morrill | Jan. 28, 1958 |